A. S. BROWNELL.
Coupling for Pipes.
No. 213,037.    Patented Mar. 11, 1879.
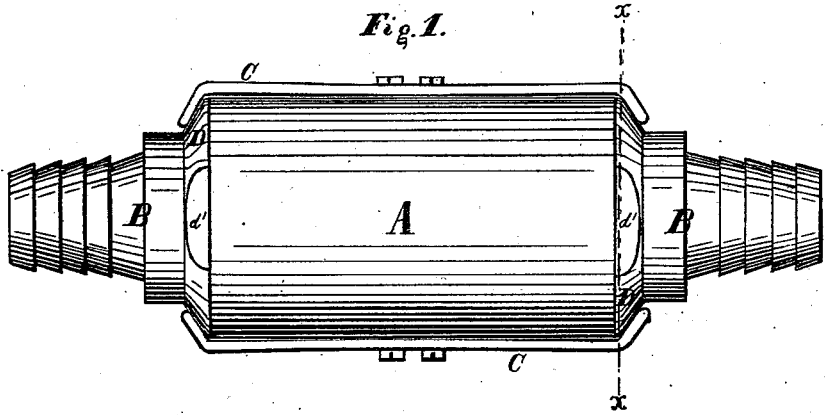
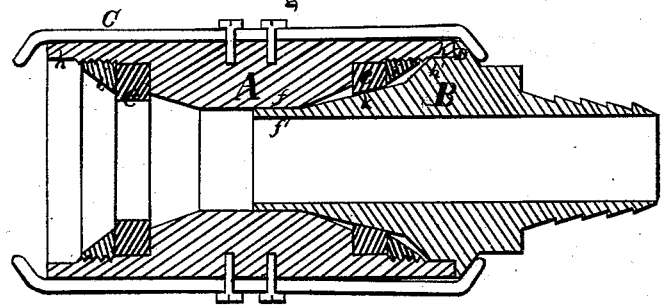
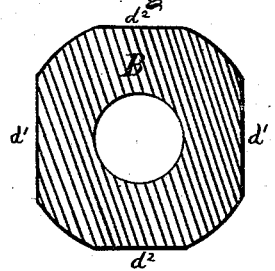
Witnesses:
W. Sherburne
Jas. H. Burgess.
Inventor:
Andrew S. Brownell

UNITED STATES PATENT OFFICE.

ANDREW S. BROWNELL, OF WATERTOWN, MASSACHUSETTS.

IMPROVEMENT IN COUPLINGS FOR PIPES.

Specification forming part of Letters Patent No. 213,037, dated March 11, 1879; application filed March 18, 1878.

*To all whom it may concern:*

Be it known that I, ANDREW S. BROWNELL, of Watertown, in the county of Middlesex and State of Massachusetts, have invented a new and Improved Double Coupling, of which the following, when taken in connection with the accompanying drawings, is a full, clear, and exact description.

This double coupling is specially designed for use in connecting pipes between railroad-cars, for conveying steam, air, gas, &c., from car to car.

The nature of this double coupling consists in the peculiar construction of a double female coupling, to which are fitted interchangeable male couplings, and it is so constructed as to allow of their being forcibly separated without injury.

Figure 1 shows the female coupling A, male couplings B B, and springs C C, which, being clasped upon shoulder D, hold the coupling B securely in place when inserted into coupling A. Fig. 2 is a sectional view of the double coupling A, which is constructed alike at each end, and the coupling B, which fits either end of coupling A.

The bearings or guides $f$ and $h$ of coupling A join the correspondingly-fitted parts $f'$ and $h'$ of coupling B when inserted into coupling A, and the packing-ring $e$, which is kept in place by nut $i$, fits tightly to the beveled part $k$ of coupling B when the latter is inserted through the packing-ring.

Fig. 3 is a cross-section of coupling B at $x$, showing the squared sides $d^1 d^1$ and $d^2 d^2$ of the shoulder D.

When the coupling B is inserted into coupling A, being guided by the bearings $f$ and $h$, the beveled part $k$ is forced into the packing-ring $e$, making a tight joint, while the springs C C hold the couplings together. When inserting the coupling B the curved ends of springs C C pass, with little obstruction, over the squares $d^1 d^1$ of shoulder D. The coupling B is then to be turned one-quarter round, expanding the springs over the shoulder D, and bringing them over squares $d^2 d^2$, which serve to hold the springs in that place, while holding the couplings together.

To disconnect the couplings, the coupling B is turned so as to bring the springs C C to the squares $d^1 d^1$, when they are easily separated. The springs C C will expand sufficiently to allow the separation of the parts by drawing the springs forcibly over the shoulder D, to prevent the breaking of couplings or pipes, in case the cars so connected are separated, without separating the couplings.

Having thus described my invention, what I claim, and desire to secure by Letters Patent, is—

In a double interchangeable coupling, the combination, with the part A, having springs C C, packing-ring $e$, and guides $f$ and $h$, of the parts B B, having guides $f'$ and $h'$, beveling $k$, and shoulder D, with squares $d^1 d^1$ and $d^2 d^2$.

ANDREW S. BROWNELL.

Witnesses:
C. W. SHERBURNE,
JAS. H. BURGESS.